June 2, 1942.  G. M. HEANEY  2,284,868
EDUCATIONAL APPARATUS
Filed July 28, 1941
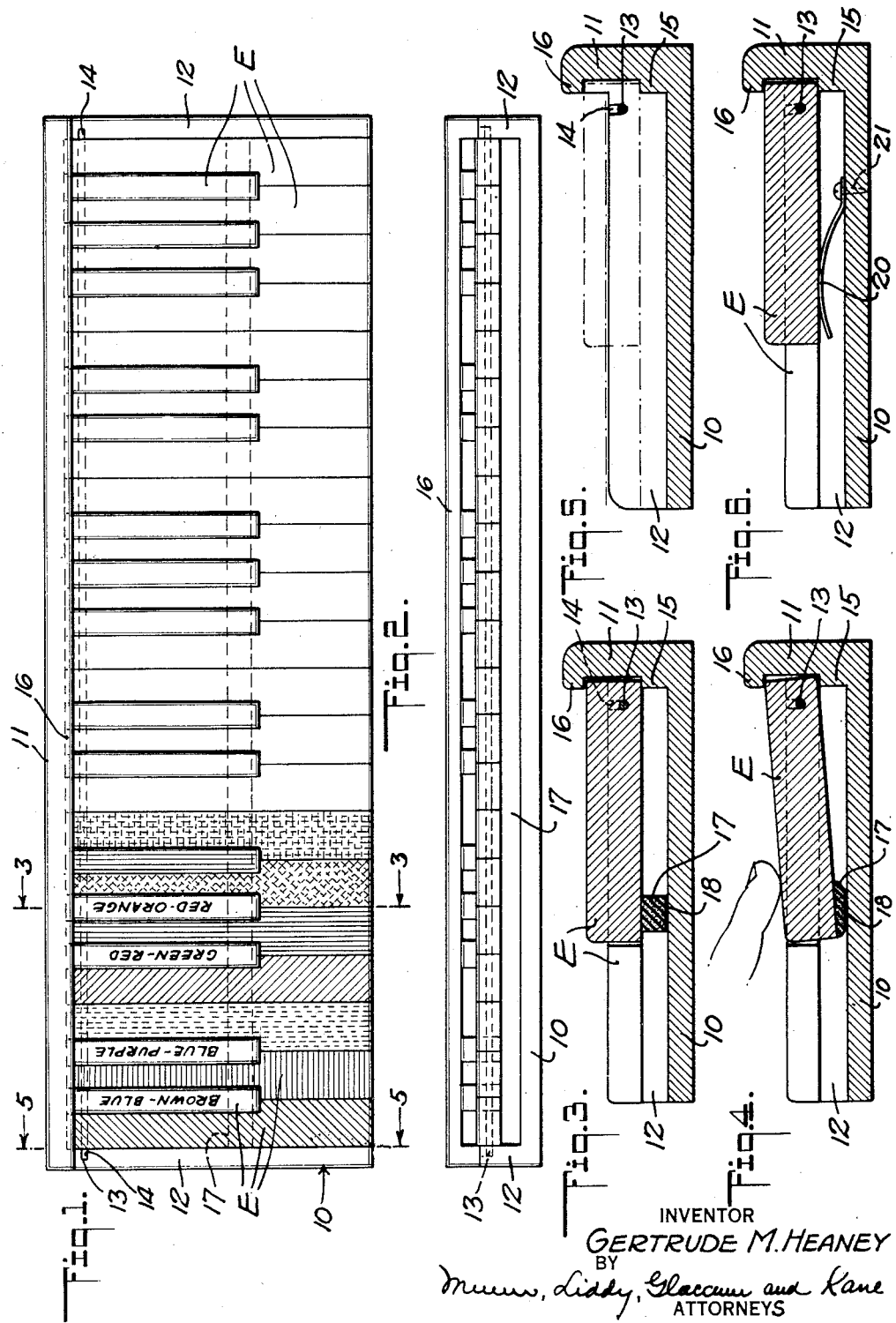
INVENTOR
GERTRUDE M. HEANEY
BY
Munn, Liddy, Glaccum and Kane
ATTORNEYS Patented June 2, 1942

2,284,868

UNITED STATES PATENT OFFICE 2,284,868

EDUCATIONAL APPARATUS

Gertrude M. Heaney, Hollywood, Calif.

Application July 28, 1941, Serial No. 404,275

3 Claims. (Cl. 84—478)

This invention relates generally to the art of teaching music, and more particularly to means for teaching the playing of musical instruments equipped with a keyboard.

An object of the invention is to provide an apparatus by which teaching of the piano or other musical instrument having a keyboard, can be effected in a highly interesting and absorbing manner obviating the need for alphabetical note reading, and substituting therefor a set of colors by which the notes of an octave are distinguished from each other on a piano keyboard-simulating device, which can be manipulated similarly to the usual piano keys, all to the end of placing the opportunity for learning to play the actual instrument, within the reach of small children whose knowledge of the alphabet has not progressed to the point of being able to read and memorize notes by their alphabetical designations in the musical scale.

Another object of this invention is to provide a keyboard-simulating apparatus which can be used in conjunction with a music book of a nature particularly appealing to the minds of small children, and by which the notes of the musical scale are colored to correspond with the color of the keys of the apparatus, which latter can be disassembled and its parts utilized in the manner of building blocks to create various types of structures, whereby to materially stimulate the mind of the child in the association of the various preselected colors with the respective keys so as to greatly facilitate the fixing of their proper relationship on the keyboard and musical staff.

With these and other objects in view, the invention resides in the combination and arrangement of elements as set forth in the following specification and particularly pointed out in the appended claims.

In the accompanying drawing,

Figure 1 is a plan view of the educational apparatus embodying this invention;

Figure 2 is a view of the apparatus in front elevation;

Figure 3 is a transverse sectional view taken on the line 3—3 of Figure 1;

Figure 4 is a view similar to Figure 3, and illustrating a key in depressed position;

Figure 5 is a transverse sectional view taken on the line 5—5 of Figure 1;

Figure 6 is a view similar to Figure 3, and illustrating a slightly modified form of apparatus.

Referring specifically to the drawing, the invention comprises a support or base 10 rectangular in plan and having a vertical rear wall 11 and end walls 12. The front of the base is open, and its area between the walls 11 and 12 is such as to freely receive a set of key-simulating elements E co-acting to form a portion of a piano keyboard.

In the present instance, the set of elements E is composed of three octaves of twelve keys each, although a lesser or greater number of octaves can be provided if desired without involving invention.

The elements E are fulcrumed at their rear ends on an axis-forming element or rod 13, the ends of which project from the endmost elements and are demountably received in upwardly opening slots 14 in the end walls 12. The rear ends of the elements rest upon a flange 15 projecting from the rear wall 11, and are confined freely for pivotal movement between such flange and a retaining flange 16 also projecting from the rear wall. A resilient means, which may be in the form of a member 17 of elastic rubber cemented at 18 to the base 10 and co-extensive in length with the set of elements E as shown in Figures 2 and 3, or in the form of individual flat springs 20 secured by fasteners 21 at one end to the base as shown in Figure 6, normally supports the elements in a playing or keyboard-forming position wherein the elements are clear of the top surface of the base. Thus the elements are yieldingly supported for depressing movements by manipulation as in playing upon the elements (Figure 4), and will be automatically restored to the elevated position shown in Figure 3, upon being released.

For the purpose of distinguishing the elements of each octave from each other to enable small children without knowledge of the alphabet to learn playing of the piano in a highly interesting and simple manner, the top surfaces or a suitable portion of the elements are distinctively colored. The coloring can be applied as a coating or by any well known process. The seven elements representing the natural notes of an octave in the musical scale are preferably colored as follows, starting from the lowest note and as indicated in Figure 1: Brown, blue, purple, green, red, orange and yellow. The five elements representing the half notes of the octave are preferably colored as a mixture of the colors applied to the natural note-representing elements at opposite sides thereof, with the exception of the highest half note which is colored pink as being more distinctive than any intermediate shade between "yellow" and "orange."

By thus distinguishing the keys with suitable colors, very young children to whom instruction in playing the piano would be denied without some knowledge of the alphabet, can readily learn to play by utilizing the apparatus in conjunction with an artistic and interesting instruction booklet (not shown), in which music is or can be written by colored notes corresponding to the colors of the respective keys of the apparatus. Thus can a child study melody and piano work without any need for the use of meaningless and dull alphabetical designations of the notes which convey nothing to the young student, and do not have the appeal in holding the interest of the student, that colors and the associated moods thereof are known to impress upon the mind.

By tilting the set of elements upwardly as a unit, or at least tilting a few of the elements upwardly at the ends of the set, the rod 13 can be flexed sufficiently for its ends to clear the slots 14 and thereby permit the set of elements to be demounted from the rod. The individual elements can now be utilized in the manner of toy building blocks to set up various types of structures such as houses, towers and various designs.

Furthermore, by thus rendering the elements easily and simply demountable, the opportunity is provided for the child to attempt to re-assemble the elements in their proper relationship on the rod by memorizing the colors, all in order to advance the progress of the child in learning to play the piano by the use of colors identifying the notes in lieu of the alphabetical designations of the notes.

I claim:

1. Educational apparatus comprising: a set of piano-forte key-simulating elements; a base having end walls provided with upwardly opening slots spaced from the outer sides of said end walls; a rod providing a common axis for said elements and having its ends seated in said slots so as to be confined thereby against axial displacement and to mount the elements rockably on the base for manipulation as in piano playing or utilization as a toy in building various structures according as the elements are mounted or demounted; the base having a retaining flange co-acting with at least certain of the elements to confine said rod against accidental displacement from said slots; and means co-acting with the base and said elements to urge the latter upwardly to a keyboard-forming position.

2. Educational apparatus comprising: a set of piano-forte key-simulating elements; a base having a rear wall, an open front and end walls provided with upwardly opening slots closed at the outer sides of said side walls; a flexible rod on which said elements are rockably mounted, having its ends seated in said slots to lock the elements on the base for manipulation as in piano playing; and yieldable means coacting with the elements to support them in keyboard-forming position, said elements and rod being removable from the base upon tilting the elements sufficiently for the ends of the rod to clear the slots and permit withdrawal of the rod and elements as a unit.

3. Educational apparatus comprising: a set of piano-forte key-simulating elements; a base having a rear wall, an open front and end walls provided with upwardly opening slots; a rod on which said elements are rockably mounted, having its ends seated in said slots to mount the elements on the base for manipulation as in piano playing; said rear wall having a retaining flange and a seat between which the rear ends of said elements are disposed to confine the rod ends in said slots; and means urging the elements upwardly to a keyboard-forming position.

GERTRUDE M. HEANEY.